US008473143B2

(12) United States Patent
Stark et al.

(10) Patent No.: US 8,473,143 B2
(45) Date of Patent: Jun. 25, 2013

(54) SYSTEM AND METHOD FOR ACCIDENT LOGGING IN AN AUTOMATED MACHINE

(75) Inventors: Shannon K. R. Stark, Morton, IL (US); Clayton Reitz, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 1048 days.

(21) Appl. No.: 12/292,990

(22) Filed: Dec. 2, 2008

(65) Prior Publication Data

US 2010/0138094 A1 Jun. 3, 2010

(51) Int. Cl.
*G01C 22/00* (2006.01)
*G05D 1/00* (2006.01)

(52) U.S. Cl.
USPC ............ 701/28

(58) Field of Classification Search
USPC ............ 701/23, 28
See application file for complete search history.

(56) References Cited

U.S. PATENT DOCUMENTS 5,815,093 A 9/1998 Kikinis
6,246,933 B1 6/2001 Bague
6,298,290 B1 10/2001 Abe et al.
6,324,450 B1 11/2001 Iwama
6,421,080 B1 7/2002 Lambert
6,630,884 B1 10/2003 Shanmugham
6,718,239 B2 4/2004 Rayner
6,741,165 B1 5/2004 Langfahl et al.
6,831,556 B1 12/2004 Boykin
7,088,387 B1 * 8/2006 Freeman et al. ............ 348/155
7,133,661 B2 11/2006 Hatae et al.
7,180,407 B1 2/2007 Guo et al.
7,212,120 B2 5/2007 Gudat
7,254,482 B2 8/2007 Kawasaki et al.
7,386,376 B2 * 6/2008 Basir et al. ............ 701/33.4
2004/0217851 A1 11/2004 Reinhart
2005/0107934 A1 5/2005 Gudat et al.
2005/0228763 A1 10/2005 Lewis et al.
2006/0142981 A1 * 6/2006 Greiffenhagen et al. ......... 703/2
2006/0177119 A1 8/2006 Mcpheely et al.
2007/0106474 A1 5/2007 Ide
2007/0132773 A1 * 6/2007 Plante ............ 345/564
2007/0145193 A1 6/2007 Hakki et al.
2008/0059054 A1 3/2008 Yamada
2008/0111666 A1 5/2008 Plante et al.
2008/0114502 A1 5/2008 Breed et al.
2008/0114543 A1 5/2008 Vishnu
2009/0062993 A1 * 3/2009 Morey et al. ............ 701/50
2009/0140887 A1 * 6/2009 Breed et al. ............ 340/990
2010/0039294 A1 * 2/2010 Feyereisen et al. ........... 340/972

* cited by examiner

*Primary Examiner* — Khoi Tran
*Assistant Examiner* — Harry Oh
(74) *Attorney, Agent, or Firm* — Finnegan, Henderson, Farabow, Garrett & Dunner LLP

(57) ABSTRACT

A system for logging visual and sensor data associated with a triggering event on a machine is disclosed. The system may include a camera disposed on an autonomous machine to provide a visual data output and a sensor disposed on the autonomous machine to provide an operational parameter output. The system may also include a memory buffer to store the visual data and operational parameter output of the autonomous machine and a permanent memory device to selectively store contents of the memory buffer. The system may further include a controller configured to detect a condition indicative of the triggering event on the autonomous machine. The controller may also be configured to store the contents of the memory buffer in the permanent memory at a predetermined time after the triggering event, said contents corresponding to the visual data output and operational parameter output occurring before, during, and after the triggering event.

23 Claims, 3 Drawing Sheets

SYSTEM AND METHOD FOR ACCIDENT LOGGING IN AN AUTOMATED MACHINE

TECHNICAL FIELD

The present disclosure relates generally to accident logging, and, more particularly, to a system and method for accident logging in remotely and autonomously controlled machines.

BACKGROUND

Industrial machines, such as dozers, motor graders, wheel loaders, and other types of heavy equipment are used to perform a variety of tasks. In the performance of these tasks, the machine may be involved in an accident event. For example, the machine may collide with an object, rollover, become stuck, or be rendered inoperable. When under the direct control of a human operator, accident events may be anticipated by the operator with sufficient time to implement appropriate avoidance measures. However, in some situations the risk of an accident may be difficult for the operator to identify, anticipate, and/or avoid. The potential for an accident may be even greater when the machine is controlled remotely or autonomously without a human operator located on-board the machine, as computer systems may not be as equipped to adapt to their surroundings as a human operator.

In some machines, collision warning systems may be employed to warn an operator or a machine controller of a risk of an accident event. However, such systems may not possess the capability to identify potential accident event causes of the work environment and record machine parameters for a time period after identification of the potential accident event. Data collection from the time period associated with an accident event may help identify machine behavior that may be characteristic of an imminent accident event. Such data may be used to adaptively improve collision warning systems and operator training systems. Accordingly, there is a need for a system and method for collecting and logging data associated with an accident event, upon detection of a triggering event indicative of an accident.

A vehicle accident recording system is described in U.S. Pat. No. 5,815,093 (the '093 patent) issued to Kikinis on Sep. 29, 1998. The vehicle accident recording system of the '093 patent employs a digital camera connected to a controller, a non-volatile memory, and an accident-sensing interrupter. Vehicle data is sampled and recorded at the same time as each sampled image from the digital camera. Vehicle data may be stored along with the sampled images in sectors of flash memory. The flash memory may be recorded to a permanent memory in the event of a collision. On detection of an accident by impact, deceleration, or rollover sensors, one additional data sample is collected before recording is stopped. The flash memory or permanent memory may be downloaded to another device.

Although the system of the '093 patent may record vehicle data and images from a digital camera, it may not be able to continue to record data after a collision, in a meaningful way. Therefore, it may not be effective in the analysis of post-collision events, such as operator reactions to the collision, secondary collisions, etc. Additionally, the system of the '093 patent may not detect "near misses." A "near miss" may be an event that, in the time period leading up to the "near miss", had the potential for resulting in a collision. A "near miss" may be of interest for improving the accuracy of autonomous machine control and operator training in remotely controlled machines.

The disclosed system and method are directed to improvements in the existing technology.

SUMMARY

In one aspect, the present disclosure is directed to a system for logging visual data and sensor data associated with a triggering event. The system may include a camera disposed on an autonomous machine to provide a visual data output and a sensor disposed on the autonomous machine to provide an operational parameter output. The system may also include a memory buffer to store the visual data output and the operational parameter output of the autonomous machine and a permanent memory device to selectively store the contents of the memory buffer. The system may further include a controller configured to detect a condition indicative of the triggering event on the autonomous machine. The controller may also be configured to store the contents of the memory buffer in the permanent memory at a predetermined time after the triggering event, said contents corresponding to the visual data output and the operational parameter output occurring before, during, and after the triggering event.

In another aspect, the present disclosure is directed to a method of logging visual data and sensor data associated with a triggering event in an autonomous machine. The method may include receiving a visual data output from the autonomous machine and receiving an operational parameter output from the autonomous machine. The method may also include storing the visual data output and the operational parameter output in a memory buffer on the autonomous machine and detecting a condition indicative of the triggering event on the autonomous machine. The method may further include continuing to store the visual data output and the operational parameter output in the memory buffer for a predetermined time after the triggering event on the autonomous machine and storing contents of the memory buffer in a permanent memory device, said contents occurring before, during, and after the triggering event and said contents to include the visual data output and the operational parameter output.

In yet another aspect, the present disclosure is directed to an autonomous machine. The autonomous machine includes a power source and a traction device driven by the power source to propel the machine. The autonomous machine also includes a camera to provide a visual data output and a sensor to provide an operational parameter output. The autonomous machine further includes a memory buffer to store the visual data output and the operational parameter output and a permanent memory device to selectively store the contents of the memory buffer, to include the visual data output and the operational parameter output. The autonomous machine may further include a controller configured to detect a condition indicative of a triggering event and store the contents of the memory buffer in the permanent memory at a predetermined time after the triggering event, said contents corresponding to the visual data output and the operational parameter output occurring before, during, and after the triggering event.

DETAILED DESCRIPTION

Figure 1:
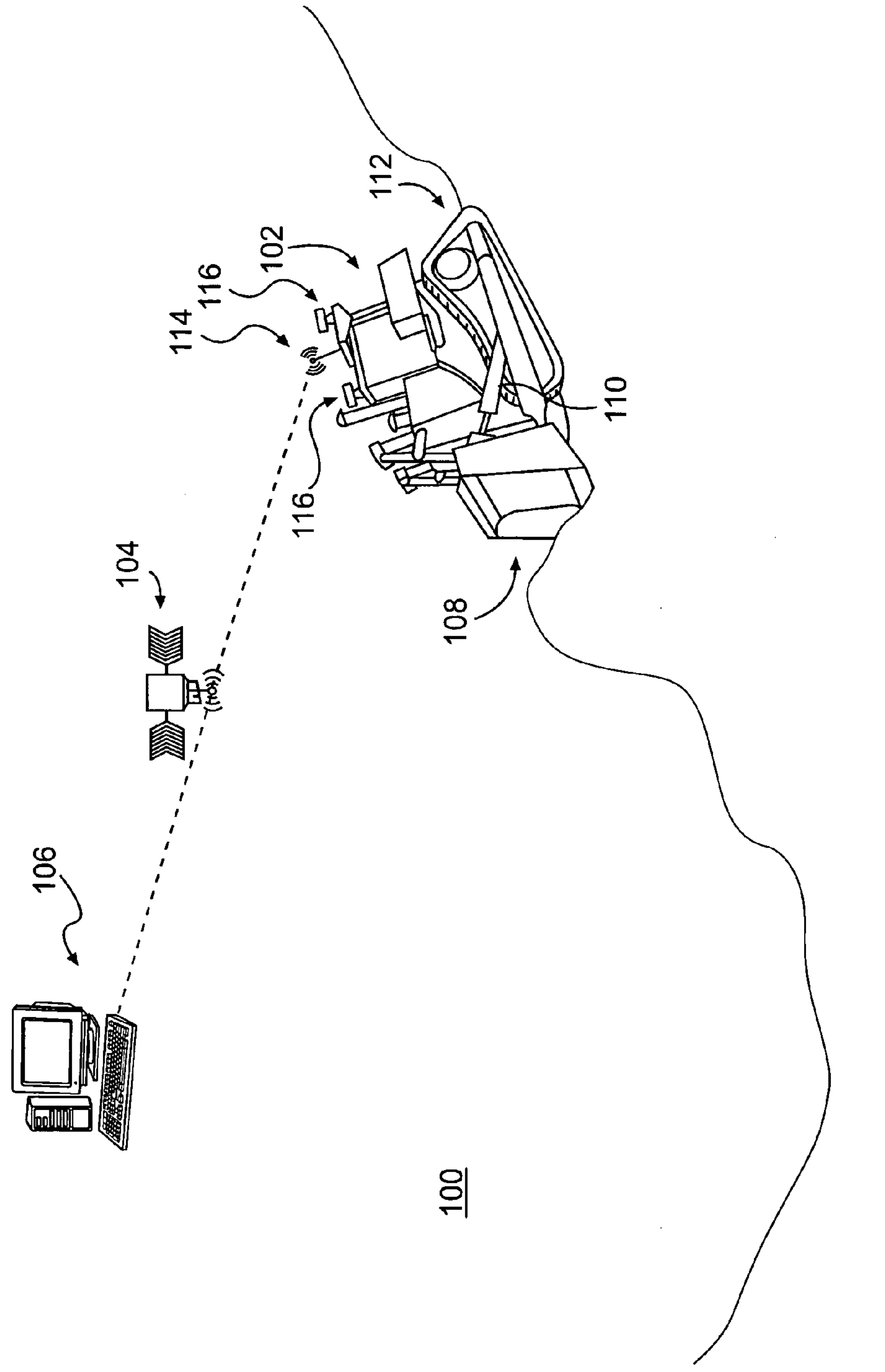
FIG. 1 is a pictorial illustration of an exemplary disclosed machine operating at a worksite.

FIG. 1 illustrates a worksite 100 with an exemplary machine 102 performing a task. Worksite 100 may include, for example, a mine site, a landfill, a quarry, a construction site, or any other type of worksite known in the art. The task may be associated with any activity appropriate at worksite 100, and may require machine 102 to traverse worksite 100. In one exemplary embodiment, the task may be associated with altering the current geography at worksite 100. For example, the task may include a grading operation, a leveling operation, a bulk material removal operation, or any other type of operation that results in alteration of the current geography at worksite 100. As machine 102 moves about worksite 100, a satellite 104 or other communications system may communicate with a control system 106.

In one embodiment, machine 102 may embody a mobile machine that performs some type of operation associated with an industry, such as mining, construction, farming, or any other industry known in the art. For example, machine 102 may embody an earth moving machine such as a dozer having a blade or other work implement 108 movable by way of one or more motors or cylinders 110. Machine 102 may also include one more traction devices 112, which may function to steer and/or propel machine 102 around worksite 100. It is contemplated that machine 102 may include any type of mobile machine 102 that may traverse worksite 100, and may be autonomously, remotely, or manually controlled. As used herein, an autonomous machine is a machine configured to be operated without a human operator, and a remotely controlled machine is a machine with an operator not located onboard the machine.

As illustrated in FIG. 1, machine 102 may be in wireless communication with a control system 106 and/or another remote controller via a satellite 104 or by another wireless communication system, by way of antenna 114. Therefore, the operation of machine 102 may be monitored and manipulated via control system 106 and/or another remote station via satellite 104 or by another wireless communication system as machine 102 moves around worksite 100.

As machine 102 traverses worksite 100, it may encounter any number of obstacles that make movement of machine 102 difficult, hazardous, or even impossible. The obstacles at worksite 100 may include, for example, a natural obstacle such as a cliff, a body of water, a tree, or a high grade; and a road condition such as a pothole, loose gravel, or a dynamic weather related-condition such as, for example, ice or mud. The obstacles at worksite 100 may further include a hazardous area such as a fuel site, a waste site, or the site of an explosive operation; a stationary inanimate object such as a fire hydrant, a parking lot, a gas/electric line, a tank, or a generator; a facility such as a storage facility or a trailer/portable building; and/or other vehicles.

Machine 102, and components and subsystems associated therewith, may be configured to detect certain triggering events, which may be indicative of a potential occurrence of an accident event. In some cases, triggering events may coincide with certain events that immediately precede an accident. Alternatively, triggering events may detect behavior that appears to be indicative of an accident event, but that ultimately results in a "near miss" (i.e., an event that, in the time period leading up to the "near miss," had the potential for resulting in an accident event). By analyzing machine parameters before, during, and after a triggering event, collision avoidance systems may be adapted to more appropriately react to triggering events to take measures to avoid or reduce the severity of accident events. It may also be beneficial to examine operational parameter outputs and any visual data outputs to improve operations of such systems.

Visual data outputs for machine 102 may be provided by one or more cameras 116 mounted on or in machine 102. Cameras 116 may provide still images or video feed of worksite 100 around machine 102. The output of cameras 116 may be used by a collision avoidance system to aid in determining the state of worksite 100 and the risk of collision for machine 102.

Figure 2:
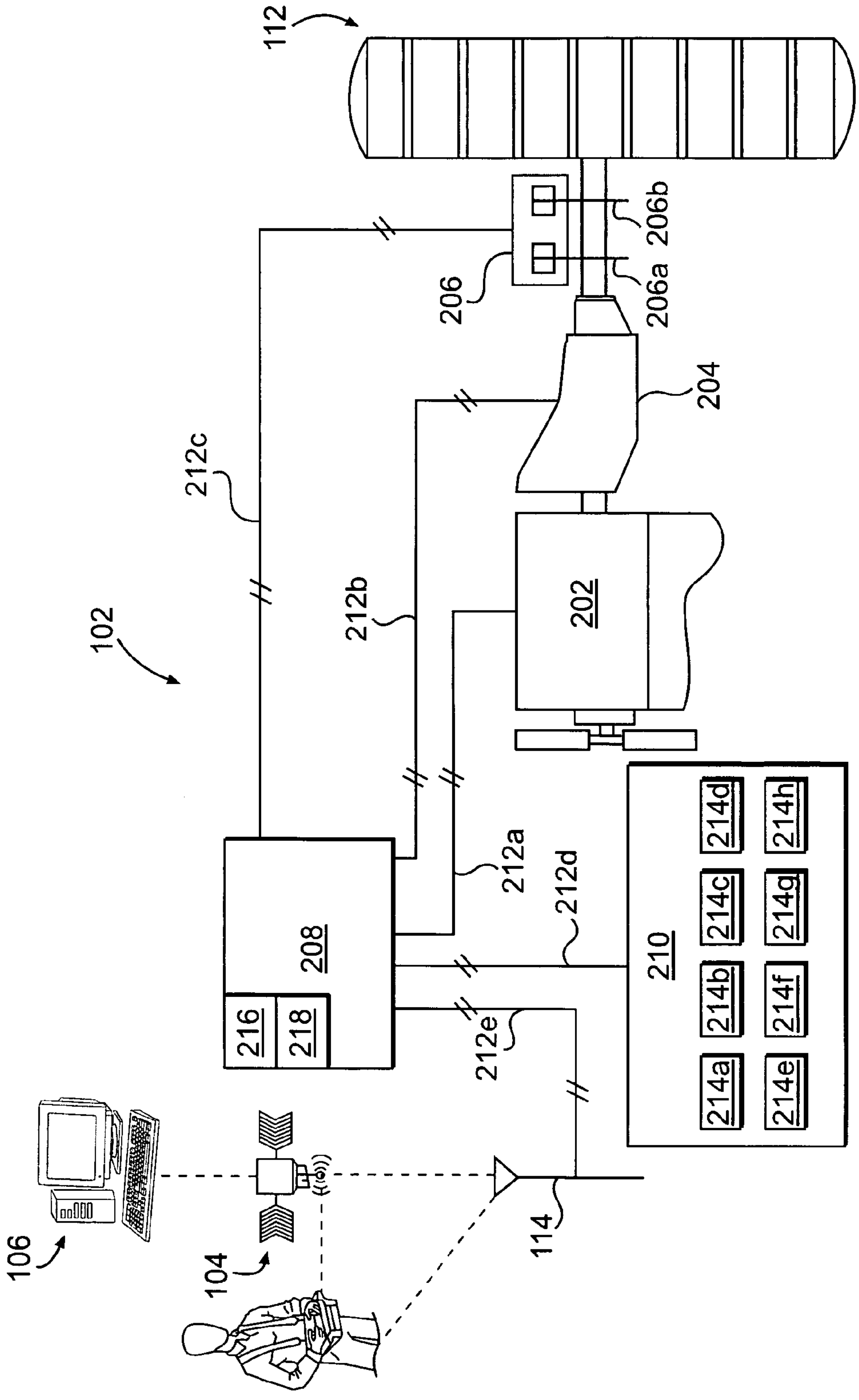
FIG. 2 is a diagrammatic illustration of an exemplary disclosed accident logging system that may be used with the machine of FIG. 1.

As illustrated in FIG. 2, machine 102 may include a power source 202, a driver 204 for driving traction devices 112 (only one shown), a brake 206 for braking traction devices 112, and a controller 208, which includes various components that interact to affect operation of machine 102 in response to commands received from control system 106. Controller 208 may be coupled to antenna 114 to communicate with the handheld device controlled by control system 106 and/or a remote computing system, via satellite 104. Alternatively, controller 208 may include antenna 114. Controller 208 may also include or be communicatively coupled to a data module 210. Controller 208 may be communicatively coupled to power source 202, driver 204, brake 206, data module 210, and antenna 114 via communication links 212*a*, 212*b*, 212*c*, 212*d*, and 212*e*, respectively.

Power source 202 may include an engine, such as, for example, a diesel engine, a gasoline engine, a gaseous fuel powered engine such as a natural gas engine, or any other type of engine. Power source 202 may alternatively include a non-combustion source of power such as a fuel cell, a power storage device, an electric motor, or other similar mechanism. Power source 202 may be connected to propel driver 204 via a direct mechanical coupling (e.g., shaft), a hydraulic circuit, or in any other suitable manner.

Driver 204 may include a transmission, such as a mechanical transmission having three forward gears, three reverse gears, and a neutral condition. In an alternative embodiment, driver 204 may include a motor and a pump, such as a variable or fixed displacement hydraulic pump operably connected to power source 202. In yet another embodiment, driver 204 may embody a generator configured to produce an electrical current used to drive traction devices 112 by way of an electrical motor, or any other device for driving traction devices 112.

Brake 206 may include any combination of braking mechanisms configured to slow or stop a rotation of traction devices 112. Brake 206 may include both a service brake 206*a* and a parking brake 206*b*. Service brake 206*a* and parking brake 206*b* may be any type of retarding mechanisms suitable for retarding the rotation of traction devices 112. In one embodiment, service brake 206*a* and parking brake 206*b* may include hydraulically-released, spring-applied, multiple wet-disc brakes. However, service brake 206*a* and parking brake 206*b* may include any other type of brakes known in the art, such as air brakes, drum brakes, electromagnetic brakes, or regenerative brakes. Service brake 206*a* and parking brake 206*b* may also be incorporated into a mechanism of driver 204. In one embodiment, service brake 206*a* and parking brake 206*b* may be manually-actuated by levers or pedals disposed in an operator cab of machine 102.

Data module 210 may include a plurality of sensing devices 214*a-h* distributed throughout machine 102 to gather real-time operational parameter outputs from various components and systems of the machine, and communicate corresponding signals to controller 208. For example, sensing devices 214*a-h* may be used to gather information associated with operation of power source 202 (e.g., speed, torque, etc.), driver 204 (e.g., gear ratio, etc.), brake 206 (e.g., actuation, temperature, etc.), and/or traction devices 112 (e.g., rotational speed, etc.). Sensing devices 214*a-h* may also be used to gather real-time operational parameter outputs regarding machine positioning, heading, speed, acceleration, and/or loading. Sensing devices 214*a-h* may also be used to gather real-time data associated with worksite 100, such as, for example, still images or video feed from one or more cameras 116 mounted on machine 102. It is contemplated that data module 210 may include additional sensors to gather real-time operational parameter outputs associated with any other machine and/or worksite operational parameters known in the art.

In one embodiment, a position locating device 214*a* may gather real-time operational parameter outputs associated with the machine position, machine heading, and/or ground speed. For example, position locating device 214*a* may embody a global positioning system (GPS) comprising one or more GPS antennae disposed at one or more locations about machine 102 (e.g., at the front and rear of machine 102). The GPS antenna may receive and analyze high-frequency, low-power electromagnetic signals from one or more global positioning satellites. Based on the timing of the one or more signals, and/or information contained therein, position locating device 214*a* may determine a location of itself relative to the satellites, and thus, a 3-D global position and orientation of machine 102 may be determined by way of triangulation. Signals indicative of this position may then be communicated from position locating device 214*a* to controller 208 via communication link 212*d*. Alternatively, position locating device 214*a* may embody an Inertial Reference Unit (IRU), a component of a local tracking system, or any other known locating device that receives or determines positional information associated with machine 102.

In another embodiment, machine 102 may have one or more object sensors 214*b*. Object sensor 214*b* may be a system that detects objects and/or obstacles that are in close proximity to machine 102, and may present a risk of collision to machine 102. Object sensor 214*b* may detect objects and/or obstacles behind machine 102 and in obstructed directions, or may detect objects and/or obstacles in all directions. Object sensor 214*b* may use radar, lidar or other laser systems, radio, a visual object recognition system, or other systems known in the art. Object sensor 214*b* may provide a warning to operator of machine 102, to control system 106, and/or controller 208. The warning may be audio, visual, and/or activate automatic control and avoidance responses by machine 102.

In other embodiments, sensing devices 214*a-h* may gather real-time operational parameters associated with machine 102. Such operational parameters may include ground speed, track speed for each of the traction devices 112, inclination of machine 102 on the surface of worksite 100, loading information about machine 102, and one or more operating conditions of a transmission associated with machine 102, for example, driver 204 is "in-gear" or "out-of-gear", and/or an actual gear condition of machine 102. Sensing devices 214*a-h* may also gather real-time operational parameters associated with the engine speed of power source 202 (such as "idling"), an engine block temperature, an oil temperature, an oil pressure, or any other parameter indicative of an operating condition of power source 202. Sensing devices 214*a-h* may further gather real-time operational parameters indicative of operation of service brake 206*a* and parking brake 206*b* (e.g., when, and to what extent, service brake 206*a* and parking brake 206*b* are actuated). For example, one or more of sensing device 214*a-h* may be configured to detect when an operator has depressed switches, levers, and/or pedals corresponding to desired actuation of service brake 206*a* and parking brake 206*b*. Similarly, one or more of sensing devices 214*a-h* may be configured to detect the force with which the operator has depressed switches, levers, and/or pedals for actuating one or more of service brake 206*a* and parking brake 206*b*.

Sensing devices 214*a-h* may be configured to gather machine operational parameters over time as machine 102 moves about worksite 100. Specifically, the real-time information gathered by sensing devices 214*a-h* may be stored within the memory of controller 208 and used to generate and continuously update a machine operation history. In one aspect, the history may include a plurality of time-indexed machine operation samples. For example, each sample may include coordinates defining a position of machine 102 with respect to worksite 100, a travel direction of machine 102 at the position (e.g., heading), and/or an inclination of machine 102 at the position (e.g., a pitch angle and a roll angle with respect to the horizon). Each sample may further include time-indexed operational parameter outputs defining the operation of power source 202, driver 204, brake 206, and/or traction devices 112. Each sample may also include still images or a video feed from one or more cameras 116 on or around machine 102. In one aspect, the real-time information gathered by data module 210 may be used to provide a model of the operation of machine 102 on worksite 100 for automated control of machine 102. Further, the real time information, or selected operational parameter outputs, may be stored in flash memory in a memory buffer 216.

Controller 208 may include devices for monitoring, recording, storing, indexing, processing, and/or communicating machine operational parameter outputs to facilitate remote and/or autonomous control of the machine 102. Controller 208 may embody a single microprocessor or multiple microprocessors for monitoring characteristics of machine 102. For example, controller 208 may include a memory, a secondary storage device and/or permanent memory device 218, a clock, and a processor, such as a central processing unit or any other device for accomplishing a task consistent with the present disclosure. Numerous commercially available microprocessors can be configured to perform the functions of controller 208. It is contemplated that controller 208 could readily embody a computer system capable of controlling numerous other functions.

Controller 208 may contain or be communicatively coupled to one or more permanent memory devices 218. In one exemplary embodiment, permanent memory device 218 may be selected such that it may store the contents of a memory buffer 216. In one further embodiment, memory buffer 216 may be located in flash memory or other memory of controller 208. In a further alternate exemplary embodiment, memory buffer 216 may be located in permanent memory device 218. In another exemplary embodiment, permanent memory device 218 may contain sufficient memory to store multiple instances of the contents of memory buffer 216. The number of instances may be as few as two or three, or as many as twenty or thirty.

Controller 208 may be configured to communicate with one or more of control systems 106 and/or satellite 104 via antenna 114, and/or other hardware and/or software that enables transmitting and receiving data through a direct data link (not shown) or a wireless communication link. The wireless communication link may include satellite, cellular, infrared, radio, microwave, or any other type of wireless electromagnetic communications that enable controller 208 to exchange information. Controller 208 may additionally receive signals such as command signals indicative of a desired direction, velocity, acceleration, and/or braking of machine 102, and may remotely control machine 102 to respond to such command signals. To that end, controller 208 may be communicatively coupled with power source 202 of machine 102, the braking element of machine 102, and the direction control of machine 102. Further, controller 208 may be communicatively coupled with a user interface in the operator cabin of machine 102 to deliver information to an operator of machine 102. Additionally, controller 208 may be part of an integrated display unit in the cabin of machine 102.

In one embodiment, controller 208 may be configured to monitor the machine operational parameters of machine 102 and determine, in response to signals received from data module 210, if a triggering event, such as a collision or near miss, may have occurred. Specifically, controller 208 may, upon receiving signals from sensing devices 214_a-h_ indicating that a triggering event may have occurred for a given machine operation sample, initiate a memory logging process. Controller 208 may be configured to continue logging operational parameter outputs and visual data output to a revolving memory for a predetermined amount of time. The revolving memory may be a memory buffer 216, a first in, first out (FIFO) data buffer in memory. When memory buffer 216 is full, the oldest records may be overwritten by the newest records. The memory buffer 216 may then be stored to permanent memory device 218 for later retrieval and analysis. A triggering event may include a collision or "near miss". These features will be discussed further in the following section with reference to FIG. 3 to illustrate functionality of the disclosed accident logging system.

Figure 3:
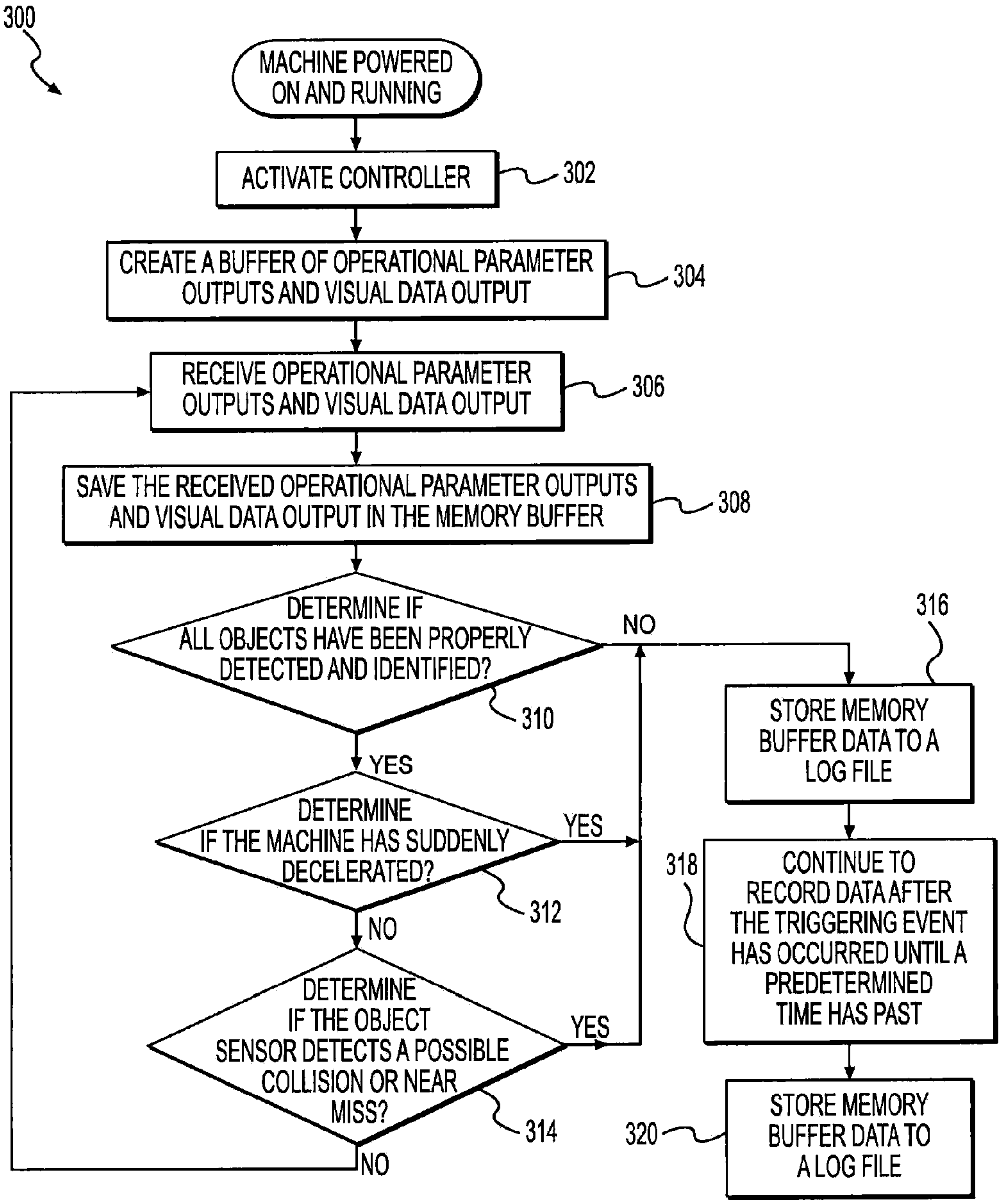
FIG. 3 is a flow chart illustrating an exemplary disclosed method of operating the accident logging system of FIG. 2.

Processes and methods consistent with the disclosed embodiments provide a system for detecting an event indicative of the occurrence of a machine accident and recording operation data collected from machine sensors, cameras 116, and other data collection devices before, during, and after the occurrence of the accident. More specifically, features associated with the disclosed processes and methods for accident logging may provide valuable information indicative of machine behavior before, during, and after a triggering event, which may facilitate identification and correction of certain problems that may cause accidents. FIG. 3 provides a flowchart 300 depicting an exemplary accident logging process, which may be implemented by controller 208, consistent with the disclosed embodiments. Controller 208 may implement an accident logging process of flowchart 300 based on triggering events, such as machine deceleration, brake system activation, and/or object sensor detection.

As represented in FIG. 3, when machine 102 is powered on and running, controller 208 may be activated (step 302). When machine 102 is powered on and running, controller 208 may create a buffer of operational parameter outputs and visual data output in a memory buffer 216 (step 304). Specifically, controller 208 may create a FIFO data buffer in memory of controller 208. Memory buffer 216 may be treated as a revolving buffer, that is FIFO, in that when memory buffer 216 is full, the oldest records may be overwritten by the newest records. The memory buffer 216 may be sized to contain data associated with a particular period of time, such as 5 minutes of data. In other embodiments, the duration of data may be as short as a few seconds, and may be as long as 30 minutes. The time duration is a matter of design choice.

When controller 208 has created a buffer of operational parameter outputs and visual data output in a memory buffer 216, controller 208 may receive operational parameter outputs and visual data output (step 306). Specifically, controller 208 may receive machine operational parameter outputs related to all operational aspects of machine 102, including deceleration, brake system activation, and/or object sensor detection data. Additionally, controller 208 may receive real-time machine operational parameter outputs related to one or more of machine ground speed, track speed for each of the traction devices 112, inclination of machine 102 on the surface of worksite 100, loading information about machine 102, and one or more operating conditions of a transmission associated with machine 102 (e.g., "in-gear" or "out-of-gear"), and/or an actual gear condition of machine 102. Controller 208 may also receive real-time operational parameter outputs associated with the engine speed of power source 202 (such as "idling"), an engine block temperature, an oil temperature, an oil pressure, or any other parameter indicative of an operating condition of power source 202. Controller 208 may further receive real-time operational parameter outputs concerning the roll, pitch, and yaw of machine 102. Additionally, any other machine operational parameter outputs of interest may be received.

When controller 208 has received operational parameter outputs and visual data output, controller 208 may save the received operational parameters and visual data output in memory buffer 216 (step 308). Specifically, controller 208 may save the received operational parameter outputs and visual data output that were received in step 306 in memory buffer 216. Memory buffer 216 may be a FIFO buffer, with storage room for a certain duration of data, with the oldest entries overwritten by the newest entries. All operational parameters and visual data output may be time stamped when saved to memory buffer 216, to associated the visual data with the operational parameters from the same time period.

When controller 208 has saved the received operational parameter outputs and visual data output in memory buffer 216, controller 208 may determine if all objects have been properly detected and identified (step 310). Specifically, object sensor 214_b_ may use radar, lidar or other laser systems, radio, a visual object recognition system, or other systems known in the art to detect and identify objects. In one embodiment, if there are inconsistencies between the various means to determine the location and velocity of any objects, not all objects have been properly detected and identified. Additionally, if there are unexpected differences between the terrain and objects identified by object sensor 214_b_ and any previously loaded terrain and/or object map, not all objects have been properly detected and identified. In an alternate embodiment, if an operator is using a machine 102 capable of remote or autonomous operation, and does not utilize the object sensor 214_b_ or any visual camera displays, step 316 may be executed. Controller 208 may monitor the use or adherence to the warnings of object sensor 214, cameras 116, and other provided process for awareness of objects and terrain conditions in worksite 100. Controller 208 may determine the operator has not properly detected and identified all objects. In all embodiments, if controller 208 determines that not all objects have been properly detected and identified, a collision and/or a near miss may occur, and step 316 may be executed. In contrast, if controller 208 determines that all objects have been properly detected and identified, step 312 may be executed.

After controller 208 has determined that all objects have been properly detected and identified, controller 208 may determine if machine 102 has suddenly decelerated (step 312). Specifically, controller 208 may monitor the acceleration of machine 102, the velocity of machine 102, and/or the position of machine 102. A sudden deceleration may indicate a collision and/or a near miss has occurred. A sudden decrease or change in velocity may also indicate a collision and/or a near miss has occurred. Controller 208 may monitor machine 102 to determine if there was a sudden deceleration, or a sudden change in velocity. If controller 208 has determined a collision and/or a near miss occurred, step 316 may be executed. In contrast, if there is no indication at this step a collision and/or a near miss occurred, step 314 may be executed.

In an alternate embodiment of step 312, controller 208 may additionally or alternately determine if brake 206 system of machine 102 has been activated. Specifically, controller 208 may monitor when, and to what extent, service brake 206*a* and parking brake 206*b* of machine 102 are being actuated. A sudden, unexpected, or hard activation of the brake system 206 may indicate a collision and/or a near miss has occurred. If controller 208 has determined a collision and/or a near miss has occurred, step 316 may be executed. In contrast, if there is no indication at this step a collision and/or a near miss has occurred, step 314 may be executed.

After controller 208 has determined that no sudden deceleration occurred, controller 208 may determine if the object sensor detects a possible collision (step 314). Specifically, controller 208 may monitor if the object sensor detects an object collided with machine 102, or came within a predetermined distance of machine 102. An object occupying the same space as machine 102 may indicate a collision. If an object comes within a predetermined distance of machine 102, machine 102 may have experienced a near miss. If controller 208 has determined a collision and/or a near miss has occurred, step 316 may be executed. In contrast, if there is no indication at this step a collision and/or a near miss has occurred, the process may revert to step 306.

When controller 208 has determined a collision and/or a near miss has occurred, controller 208 may next store memory buffer 216 data to a log file (step 316). Specifically, controller 208 may store or save the contents of memory buffer 216 to a permanent memory device 218. Because a copy of memory buffer 216 was stored to a permanent memory device 218 at the time of the triggering event, if, after the predetermined time period has passed, controller 208 is unable to store off a copy of memory buffer 216, a record of events prior to the triggering event nonetheless exists. When controller 208 has stored memory buffer 216 data to a log file, controller 208 may next continue to record data after the triggering event has occurred for a predetermined time period subsequent to the triggering event (step 318). The predetermined time period may be as short as a few seconds, and may be as long as 30 or more minutes. There may be value in examining the operational parameter outputs from machine 102 and visual data output after a collision and/or a near miss.

Once the predetermined time period has passed, controller 208 may next store memory buffer 216 data to a log file (step 320). Specifically, controller 208 may store or save the contents of memory buffer 216 to a permanent memory device 218. The log file created may overwrite the log file stored to permanent memory device 218 in step 316, or may be created as a separate or supplemental log file. The log file or files stored in permanent memory device 218 may be later downloaded from controller 208. The downloading may be manually performed by an operator of machine 102, or may be remotely prompted by satellite 104 or another wireless communication system.

While certain aspects and features associated with the system described above may be described as being performed by one or more particular components of controller 208, it is contemplated that these features may be performed by any suitable computing system. Furthermore, it is also contemplated that the order of steps in FIG. 3 is exemplary only and that certain steps may be performed before, after, or substantially simultaneously with other steps illustrated in FIG. 3. For example, in some embodiments, step 316 may be omitted.

INDUSTRIAL APPLICABILITY

The presently disclosed accident logging system may be applicable to any mobile machine in which it may be desirable to monitor and record operational behavior of a machine in the presence of a triggering event that may be indicative of an imminent accident event. The recorded operational behavior may be retrieved and analyzed to identify behavioral patterns of the machine (or its constituent components) prior to and during an accident event. The accident logging system described herein may be particularly advantageous to worksites that employ machines with programmable or adaptive collision avoidance systems, to more effectively identify and mitigate accident-triggering behavior. Such a solution may be particularly advantageous in worksite environments that employ autonomous ("operator-less") machines, as the obstacle detection and collision avoidance systems represent the primary decision-making entities on-board the machine.

The disclosed accident logging system may detect near misses and save a log file of operational parameter outputs and visual data output before and after the near miss. A near miss may be an avoided collision, or some other event that caused the operator or machine 102 to react suddenly and unexpectedly. A near miss may be of interest for improving the accuracy, safety, and efficiency of autonomous machine control and operator training in remotely controlled and manually controlled machines 102.

The disclosed accident logging system may record operational parameter outputs and visual data output for a predetermined time period after a triggering event. Therefore, the disclosed accident logging system may be effective in the analysis of post-collision or post-near miss events. Not only is the performance of the machine 102 and/or the operator of interest immediately before a triggering event, the performance, reactions, and consequent events after a triggering event may be of interest in autonomous machine control and in operator training in remotely controlled and manually controlled machines 102.

It is contemplated that the disclosed accident logging system could be implemented in conjunction with manually and/or autonomously controlled machines, as well as remotely controlled machines. In the case of a manually controlled machine, the system may be implemented in the same manner discussed above, except that the operator may be on-board machine 102. In the case of an remotely controlled machine where no operator is present, the system may also be implemented as discussed above.

It will be apparent to those skilled in the art that various modifications and variations can be made to the disclosed accident logging system. Other embodiments will be apparent to those skilled in the art from consideration of the specification and practice of the disclosed accident logging system. It is intended that the specification and examples be considered as exemplary only, with a true scope being indicated by the following claims and their equivalents.

What is claimed is:

1. A system, associated with an autonomous machine, for logging visual data and sensor data associated with a triggering event, comprising:

a camera disposed on the autonomous machine to provide visual data output of an area around the autonomous machine;

a first sensor disposed on the autonomous machine to provide operational parameter output;

a memory buffer to store the visual data output and the operational parameter output of the autonomous machine;

an electronic map;

a permanent memory device to selectively store contents of the memory buffer; and a controller configured to:

identify, in the visual data output from the camera, objects in the area around the autonomous machine;

compare the identified objects in the area around the autonomous machine to the electronic map;

determine, based on the comparison, whether there is an inconsistency between the identified objects in the area around the autonomous machine and the electronic map;

detect the triggering event on the autonomous machine based on a determination that there is an inconsistency between the identified objects in the area around the autonomous machine and the electronic map; and store, responsive to detecting the triggering event, the contents of the memory buffer in the permanent memory at a predetermined time after the triggering event, the contents corresponding to the visual data output and the operational parameter output occurring before, during, and after the triggering event.

2. The system of claim 1, wherein the controller is further configured to:

determine, based on the visual data output from the camera, a potential collision or a near miss of an identified object in the area around the autonomous machine with the autonomous machine; and detect the triggering event based further on the potential collision or near miss.

3. The system of claim 1, wherein the controller is further configured to detect the triggering event based further on at least one of sudden deceleration of the autonomous machine, triggering a brake system of the autonomous machine, or detection by the camera of an object in close proximity to the autonomous machine.

4. The system of claim 1, wherein the permanent memory device includes sufficient memory to store multiple instances of the contents of the memory buffer.

5. The system of claim 1, wherein the camera is further configured to include a time stamp with the visual data output.

6. The system of claim 1, wherein the controller is further configured to store the contents of the memory buffer in the permanent memory device both at the time of the triggering event and at the predetermined time after the triggering event.

7. The system of claim 1, wherein the contents of the permanent memory device are configured to be downloaded from an integrated display unit.

8. A method of logging visual data and sensor data associated with a triggering event in an autonomous machine, comprising:

receiving, via a camera, a visual data output associated with the autonomous machine, the visual data output representative of an area around the autonomous machine;

receiving an operational parameter output from the autonomous machine;

storing the visual data output and the operational parameter output in a memory buffer on the autonomous machine;

accessing an electronic map;

identifying, in the visual data output from the camera, objects in the area around the autonomous machine;

comparing the identified objects to the electronic map;

determining, based on the comparison, whether there is an unexpected difference between the identified objects and the electronic map;

detecting the triggering event on the autonomous machine in response to a determination that there is an unexpected difference between the identified objects the electronic map;

continuing to store the visual data output and the operational parameter output in the memory buffer for a predetermined time after the triggering event on the autonomous machine; and storing, responsive to detecting the triggering event, contents of the memory buffer in a permanent memory device, the contents occurring before, during, and after the triggering event, and said contents to include the visual data output and the operational parameter output.

9. The method of claim 8, wherein the triggering event is indicative of a potential collision or a near miss.

10. The method of claim 8, wherein detecting a condition indicative of the triggering event further includes at least one of detecting a sudden deceleration of the autonomous machine, detecting a triggering of a brake system of the autonomous machine, or detecting an object in close proximity to the autonomous machine.

11. The method of claim 8, further including storing multiple instances of the contents of the memory buffer on the permanent memory device.

12. The method of claim 8, wherein storing the visual data output further includes a time stamp stored with the visual data output.

13. The method of claim 8, further including storing the contents of the memory buffer in the permanent memory device both at the time of the triggering event and at the predetermined time after the triggering event.

14. The method of claim 8, wherein the stored contents of the memory buffer are configured to be downloaded from an integrated display unit.

15. An autonomous machine, comprising:

a power source;

a traction device driven by the power source to propel the machine;

a camera to provide a visual data output representative of an area around the autonomous machine;

a sensor to provide an operational parameter output;

a memory buffer to store the visual data output and the operational parameter output;

an electronic map;

a permanent memory device to selectively store contents of the memory buffer, to include the visual data output and the operational parameter output; and a controller configured to:

identify, in the visual data output from the camera, objects in the area around the autonomous machine;

compare the identified objects to the electronic map;

determine, based on the comparison, whether the identified objects have been properly detected by the camera;

detect a condition indicative of a triggering event based on a determination that the identified objects have not been properly detected by the second sensor; and store, responsive to detecting the triggering event, the contents of the memory buffer in the permanent memory at a predetermined time after the triggering event, said contents corresponding to the visual data output and the operational parameter output occurring before, during, and after the triggering event.

16. The autonomous machine of claim 15, wherein the triggering event is indicative of a collision or a near miss.

17. The autonomous machine of claim 15, wherein the controller is further configured to detect a condition indicative of a triggering event based on at least one of sudden deceleration of the autonomous machine, triggering a brake system of the autonomous machine, or detection by the camera of an object in close proximity to the autonomous machine.

18. The autonomous machine of claim 15, wherein the permanent memory device includes sufficient memory to store multiple instances of the contents of the memory buffer and the contents of the permanent memory device are configured to be downloaded from an integrated display unit.

19. The autonomous machine of claim 15, wherein the camera is further configured to include a time stamp with the visual data output.

20. The autonomous machine of claim 15, wherein the controller is further configured to store the contents of the memory buffer in the permanent memory device both at the time of the triggering event and at the predetermined time after the triggering event.

21. The system of claim 1, wherein the camera includes at least one of a Light Detection And Ranging (LIDAR) device, a laser device, a radar device, or a visual object recognition device.

22. The method of claim 8, wherein the camera includes at least one of a Light Detection And Ranging (LIDAR) device, a laser device, a radar device, or a visual object recognition device associated with the autonomous machine.

23. The autonomous machine of claim 15, wherein the camera includes at least one of a Light Detection And Ranging (LIDAR) device, a laser device, a radar device, or a visual object recognition device.

* * * * *